United States Patent [19]

Saito et al.

[11] Patent Number: 5,604,530
[45] Date of Patent: Feb. 18, 1997

[54] SOLID-STATE IMAGE SENSING DEVICE FOR ENDOSCOPE AND ENDOSCOPE IMAGING APPARATUS

[75] Inventors: Katsuyuki Saito; Masao Uehara; Wataru Ohno, all of Hachioji; Masahito Goto, Ohi-machi; Shinji Yamashita, Hachioji, all of Japan

[73] Assignee: Olympus Optical Co., Ltd., Tokyo, Japan

[21] Appl. No.: 497,903

[22] Filed: Jul. 7, 1995

Related U.S. Application Data

[63] Continuation of Ser. No. 105,157, Aug. 12, 1993, abandoned.

[30] Foreign Application Priority Data

Aug. 14, 1992 [JP] Japan .................... 4-217045
Jun. 22, 1993 [JP] Japan .................... 5-150802

[51] Int. Cl.$^6$ ........................................ H04N 7/18
[52] U.S. Cl. ................................. 348/70; 348/71
[58] Field of Search ........................ 348/70, 71, 272, 348/273, 277, 65, 68, 69

[56] References Cited

U.S. PATENT DOCUMENTS

| | | | |
|---|---|---|---|
| 4,845,553 | 7/1989 | Kohomura et al. | 348/71 |
| 4,878,113 | 10/1989 | Nakamura | 348/71 |

FOREIGN PATENT DOCUMENTS

| | | |
|---|---|---|
| 53-79435 | 7/1978 | Japan . |
| 53-79433 | 7/1978 | Japan . |
| 53-79434 | 7/1978 | Japan . |
| 57-52754 | 11/1982 | Japan . |
| 58-219889 | 12/1983 | Japan . |
| 59-86982 | 5/1984 | Japan . |
| 60-37887 | 2/1985 | Japan . |
| 2-210996 | 8/1990 | Japan . |
| 2-210995 | 8/1990 | Japan . |

*Primary Examiner*—Amelia Au
*Attorney, Agent, or Firm*—Armstrong, Westerman, Hattori, McLeland & Naughton

[57] ABSTRACT

A solid-state image sensing device for endoscopes including a color mosaic filter provided on a CCD image pick-up surface and having filters arranged so that the number of G-component pixels≧the number of B-component pixels>the number of R-component pixels, the number of CCD pixels being set at a minimum requisite level in accordance with the information-amount characteristics of the endoscopic image to be picked up. A plurality of LPFs are provided in a signal processing section providing image signal resolution in which the G-component bandwidth≧B-component bandwidth>R-component bandwidth, thereby obtaining an image-signal resolution which is high enough to allow the endoscopic image to be displayed, with the B-component being equal to or smaller than the G-component and larger than the R-component.

18 Claims, 15 Drawing Sheets

| | X 1 | 2 | 3 | 4 | 5 | 6 · · · |
|---|---|---|---|---|---|---|
| Y 1 | G | G | G | G | G | G |
| 2 | B | B | R | B | B | R |
| 3 | G | G | G | G | G | G |
| 4 | B | B | R | B | B | R |
| 5 | G | G | G | G | G | G |
| 6 | B | B | R | B | B | R |

FIG.1

|   | X 1 | 2 | 3 | 4 | 5 | 6 ··· |
|---|---|---|---|---|---|---|
| Y 1 | G | G | G | G | G | G |
| 2 | B | B | R | B | B | R |
| 3 | G | G | G | G | G | G |
| 4 | B | B | R | B | B | R |
| 5 | G | G | G | G | G | G |
| 6 | B | B | R | B | B | R |

FIG. 3(a)

|   | X 1 | 2 | 3 | 4 | 5 | 6 ··· |
|---|---|---|---|---|---|---|
| Y 1 | G | G | R | G | G | R |
| 2 | B | B | G | B | B | G |
| 3 | G | G | R | G | G | R |
| 4 | B | B | G | B | B | G |
| 5 | G | G | R | G | G | R |
| 6 | B | B | G | B | B | G |

FIG.3(b)  FIG.3(c)  FIG.3(d)

G-MEMORY

| $G_{11}$ | $G_{21}$ | $G_{32}$ |
|---|---|---|
| $G_{13}$ | $G_{23}$ | $G_{34}$ |
| $G_{15}$ | $G_{25}$ | $G_{36}$ |

R-MEMORY

| $R_{31}$ | $R_{61}$ | $R_{91}$ |
|---|---|---|
| $R_{33}$ | $R_{63}$ | $R_{93}$ |
| $R_{35}$ | $R_{65}$ | $R_{95}$ |

B-MEMORY

| $B_{12}$ | $B_{22}$ | $B_{42}$ |
|---|---|---|
| $B_{14}$ | $B_{24}$ | $B_{44}$ |
| $B_{16}$ | $B_{26}$ | $B_{46}$ |

FIG.4

| | X 1 | 2 | 3 | 4 | 5 | 6 · · · |
|---|---|---|---|---|---|---|
| Y 1 | G | G | B | G | G | B |
| 2 | B | R | G | B | R | G |
| 3 | G | G | B | G | G | B |
| 4 | B | R | G | B | R | G |
| 5 | G | G | B | G | G | B |
| 6 | B | R | G | B | R | G |

FIG.5

| | X 1 | 2 | 3 | 4 | 5 | 6 · · · |
|---|---|---|---|---|---|---|
| Y 1 | G | R | G | B | G | B |
| 2 | B | G | B | G | R | G |
| 3 | G | R | G | B | G | B |
| 4 | B | G | B | G | R | G |
| 5 | G | R | G | B | G | B |
| 6 | B | G | B | G | R | G |

FIG.6

| X | 1 | 2 | 3 | 4 | 5 | 6 |
|---|---|---|---|---|---|---|
| Y 1 | G | G | G | B | B | R |
| 2 | B | B | R | G | G | G |
| 3 | G | G | G | B | B | R |
| 4 | B | B | R | G | G | G |
| 5 | G | G | G | B | B | R |
| 6 | B | B | R | G | G | G |

FIG.7

| X | 1 | 2 | 3 | 4 | 5 | 6 |
|---|---|---|---|---|---|---|
| Y 1 | G | G | G | B | R | B |
| 2 | B | R | B | G | G | G |
| 3 | G | G | G | B | R | B |
| 4 | B | R | B | G | G | G |
| 5 | G | G | G | B | R | B |
| 6 | B | R | B | G | G | G |

FIG.8

| X | 1 | 2 | 3 | 4 | 5 | 6 |
|---|---|---|---|---|---|---|
| Y 1 | G | G | G | R | B | B |
| 2 | R | B | B | G | G | G |
| 3 | G | G | G | R | B | B |
| 4 | R | B | B | G | G | G |
| 5 | G | G | G | R | B | B |
| 6 | R | B | B | G | G | G |

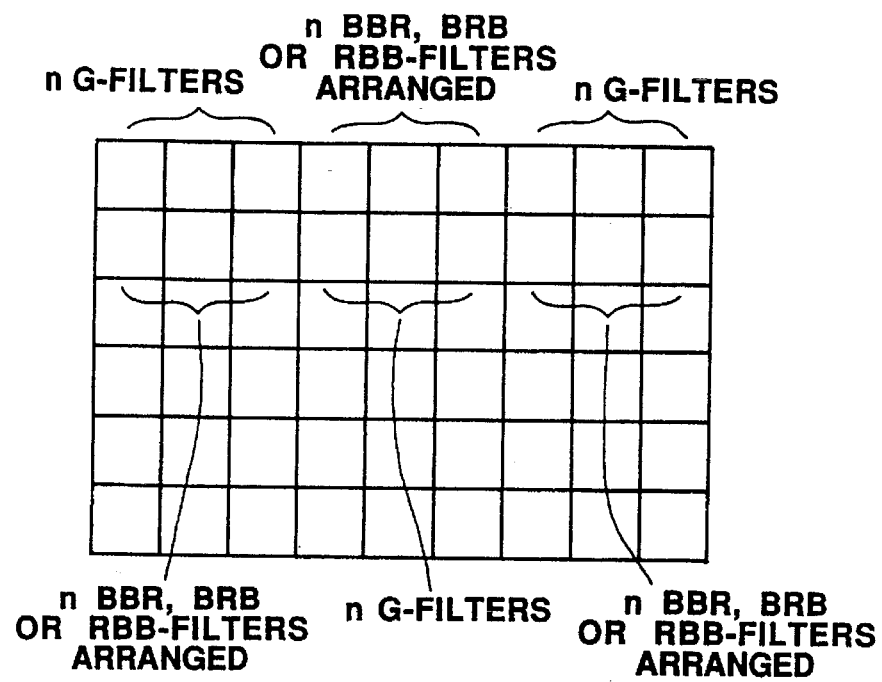

|   | X 1 | 2 | 3 | 4 | 5 | 6 · · · |
|---|---|---|---|---|---|---|
| Y 1 | G | G | G | G | G | G |
| 2 | Cy | Cy | Ye | Cy | Cy | Ye |
| 3 | G | G | G | G | G | G |
| 4 | Cy | Cy | Ye | Cy | Cy | Ye |
| 5 | G | G | G | G | G | G |
| 6 | Cy | Cy | Ye | Cy | Cy | Ye |

FIG.13(a)  FIRST LINE

| G11 | G21 | G31 | G41 | G51 | G61 | --- |
|---|---|---|---|---|---|---|

FIG.13(b)  SECOND LINE

| B12 | B22 | R32 | B42 | B52 | R62 | --- |
|---|---|---|---|---|---|---|
| G12 | G22 | G32 | G42 | G52 | G62 | |

FIG.13(c)  (a)+(b)

| B12 | B22 | R32 | B42 | B52 | R62 | --- |
|---|---|---|---|---|---|---|
| G11+G12 | G21+G22 | G31+G32 | G41+G42 | G51+G52 | G61+G62 | |

FIG.13(d)  (b)-(a)

| B12 | B22 | R32 | B42 | B52 | R62 | --- |
|---|---|---|---|---|---|---|

FIG.13(e)  (c)-(d)

| G11+G12 | G21+G22 | G31+G32 | G41+G42 | G51+G52 | G61+G62 | --- |
|---|---|---|---|---|---|---|

FIG.13(f)  OUTPUT OF S/H 32

| B12 | B22 | | B42 | B52 | | --- |
|---|---|---|---|---|---|---|

FIG.13(g)  OUTPUT OF S/H 33

| | | R32 | | | R62 | --- |
|---|---|---|---|---|---|---|

FIG.14

| | X 1 | 2 | 3 | 4 | 5 | 6 ··· |
|---|---|---|---|---|---|---|
| Y 1 | G | G | Ye | G | G | Ye |
| 2 | Cy | Cy | G | Cy | Cy | G |
| 3 | G | G | Ye | G | G | Ye |
| 4 | Cy | Cy | G | Cy | Cy | G |
| 5 | G | G | Ye | G | G | Ye |
| 6 | Cy | Cy | G | Cy | Cy | G |

|   | 1 | 2 | 3 | 4 | 5 | 6 | 7 | 8 | 9 |
|---|---|---|---|---|---|---|---|---|---|
| 1 | $G_{11}$ | $G_{12}$ | $G_{13}$ | $G_{14}$ | $G_{15}$ | $G_{16}$ | $G_{17}$ | $G_{18}$ | $G_{19}$ |
| 2 | $B_{21}$ | $B_{22}$ | $R_{23}$ | $B_{24}$ | $B_{25}$ | $R_{26}$ | $B_{27}$ | $B_{28}$ | $R_{29}$ |
| 3 | $G_{31}$ | $G_{32}$ | $G_{33}$ | $G_{34}$ | $G_{35}$ | $G_{36}$ | $G_{37}$ | $G_{38}$ | $G_{39}$ |
| 4 | $B_{41}$ | $R_{42}$ | $B_{43}$ | $B_{44}$ | $R_{45}$ | $B_{46}$ | $B_{47}$ | $R_{48}$ | $B_{49}$ |
| 5 | $G_{51}$ | $G_{52}$ | $G_{53}$ | $G_{54}$ | $G_{55}$ | $G_{56}$ | $G_{57}$ | $G_{58}$ | $G_{59}$ |
| 6 | $B_{61}$ | $B_{62}$ | $R_{63}$ | $B_{64}$ | $B_{65}$ | $R_{66}$ | $B_{67}$ | $B_{68}$ | $R_{69}$ |
| 7 | $G_{71}$ | $G_{72}$ | $G_{73}$ | $G_{74}$ | $G_{75}$ | $G_{76}$ | $G_{77}$ | $G_{78}$ | $G_{79}$ |
| 8 | $B_{81}$ | $R_{82}$ | $B_{83}$ | $B_{84}$ | $R_{85}$ | $B_{86}$ | $B_{87}$ | $R_{88}$ | $B_{89}$ |

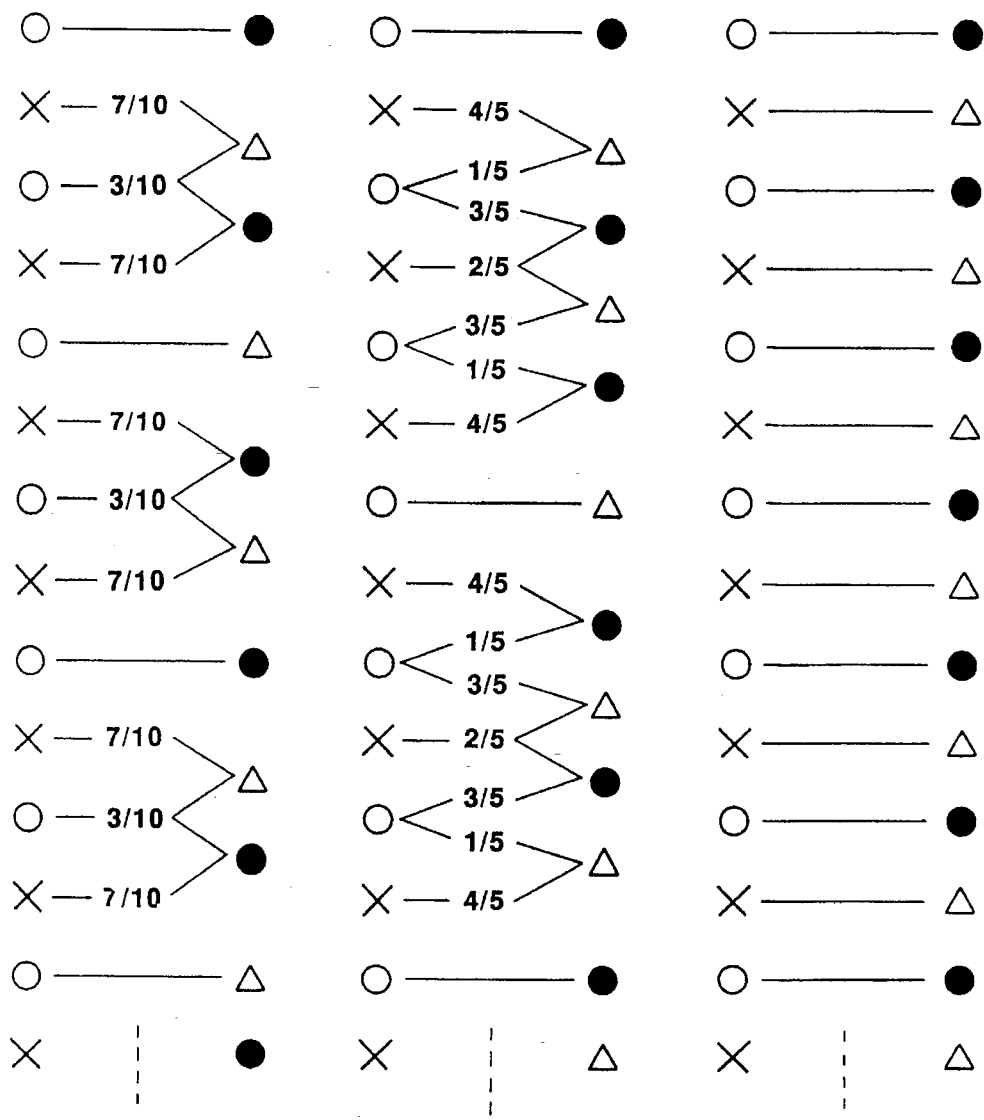

5,604,530

SOLID-STATE IMAGE SENSING DEVICE FOR ENDOSCOPE AND ENDOSCOPE IMAGING APPARATUS

This application is a continuation of application Ser. No. 08/105,157, filed Aug. 12, 1993, now abandoned.

BACKGROUND OF THE INVENTION

1. Field of the Invention

The present invention relates to a solid-state image sensing device for endoscopes for picking up endoscopic images and to an improved endoscope imaging apparatus.

2. Description of Related Art

In an electronic endoscope apparatus of a frame-sequential type, information obtained from the effective number of pixels of the CCD is processed and output as it is with respect to the three-primary-color signals of R (red), G (green) and B (blue). That is, theoretically, the resolution is the same for R, G and B.

In electronic endoscope apparatuses of a simultaneous type and external TV cameras, a color chip filter is provided on the front surface the CCD. Therefore, the resolution (frequency band width) for R and B is theoretically poorer as compared with that for G. Further, the number of R-color filters is the same as the number of B-color filters, and, in the signal processing system, the processing of the same band width is performed for R and B, so that the resolutions for R and B obtained from the CCD are theoretically the same.

In a 3-plate external TV camera, the resolution is theoretically the same for R, G and B. The resolution may be enhanced by increasing the number of pixels in the CCD. However, an increase in the number of pixels would lead to an increase in the size of the head section of the external TV camera and that of the front end section of the electronic endoscope, resulting in poor operability. Further, an increase in the number of pixels of the CCD would require an increase in memory capacity, resulting in an increase in the size of a CCU (camera control unit) for processing the output signals of the TV camera and controlling the TV camera.

In an endoscopic image, the amount of G-information is the largest, and that of B-information is the second largest, the amount of R-information being relatively small as compared with those of G and B-information.

Generally speaking, studies are being made regarding the development of image pick-up apparatuses, inclusive of endoscope imaging apparatuses, which are capable of providing a high-resolution image. One subject for such studies is the reduction of the size of the camera head section and that of the front end section of the electronic endoscope. In particular, in the endoscopic field, there is an urgent demand for reducing the diameter of the endoscope front-end section from the viewpoint of improving the insertion property and operability of the endoscope and of reducing the examination time. Further, there is also a demand for a reduction in the memory capacity of the signal processing system for processing image pick-up signals from the viewpoint of attaining a reduction in cost, apparatus size, etc.

SUMMARY OF THE INVENTION

It is an object of the present invention to provide a solid-state image sensing device for an endoscope in which the characteristics of an endoscopic image in terms of information amount is taken into consideration and which makes it possible to obtain a high-resolution image even if the number of pixels of the solid-state image sensing device is small.

Another object of the present invention is to provide an endoscope imaging apparatus in which the characteristics of an endoscopic image in terms of information amount is taken into consideration and which makes it possible to obtain a high-resolution image even when the number of pixels in the solid-state image sensing device is small.

Still another object of the present invention is to provide an endoscope imaging apparatus which can obtain a high-resolution endoscopic image and in which it is possible to reduce the size of the camera head section or the endoscope front-end section.

A further object of the present invention is to provide an endoscope imaging apparatus in which the memory capacity in the signal processing system can be reduced.

In accordance with the present invention, there is provided an endoscope imaging apparatus comprising: an endoscope which enables the interior of an object to be observed; and a light source section for supplying illuminating light to the object through the endoscope.

Further, in accordance with the present invention, there is provided an endoscope imaging apparatus comprising: a solid-state image sensing device including an image pick-up surface and a color mosaic filter which consists of a plurality of filters having different transmission wavelength bands or different bandwidths and arranged on an image pick-up surface in a proportion substantially adapted to the luminance or color-information-amount proportion of the object and which is provided on the image pick-up surface, in which an image of the object being formed to output color image signals by means of a plurality of pixels formed by the above-mentioned filters and photosensitive elements provided on the image pick-up surface so as to be opposed to the filters; and a signal processing section for performing signal-processing on the color image signals from the solid-state image sensing device.

In the above-described construction, the amount of information of the color image signals output from the solid-state image sensing device is substantially adapted to the characteristics in terms of information amount of the endoscopic image, whereby a minimum requisite number of filters are arranged and it is possible to obtain a high-resolution image even when the number of pixels of the solid-state image sensing device is small.

Other features and advantages of the present invention will become sufficiently apparent from the following detailed description.

BRIEF DESCRIPTION OF THE DRAWINGS

FIGS. 1 and 2 relate to a first embodiment of the present invention, in which:

FIG. 1 is a diagram illustrating a color-mosaic-filter arrangement;

FIG. 2 is a block diagram showing the construction of an endoscope imaging apparatus;

FIGS. 3(a) through 3(d) are diagrams illustrating a color-mosaic-filter arrangement according to a second embodiment of the present invention and the way information is written to memories;

FIG. 4 is a diagram showing a color-mosaic-filter arrangement according to a third embodiment of the present invention;

FIG. 5 is a diagram showing a color-mosaic-filter arrangement according to a fourth embodiment of the present invention;

FIG. 6 is a diagram showing a color-mosaic-filter arrangement according to a fifth embodiment of the present invention;

FIG. 7 is a diagram showing a color-mosaic-filter arrangement according to a modification of the fifth embodiment;

FIG. 8 is a diagram showing a color-mosaic-filter arrangement according to another modification of the fifth embodiment;

FIG. 9 is a diagram showing a color-mosaic-filter arrangement according to a sixth embodiment of the present invention;

FIG. 10 is a diagram showing a color-mosaic-filter arrangement according to a seventh embodiment of the present invention;

FIGS. 13(a) through 13(g) are diagrams illustrating the operation of the circuit shown in FIG. 12;

FIG. 14 is a diagram showing a color-mosaic-filter arrangement according to a ninth embodiment of the present invention;

FIGS. 17 through 24 relate to the tenth embodiment of the present invention, of which:

FIG. 17 is a block diagram showing the construction of an endoscope imaging apparatus;

FIG. 18 is a diagram illustrating a CCD read-out operation;

FIG. 19 is a block diagram for illustrating the operation of synchronization memories and a thinning-out interpolation;

FIG. 20 is a diagram illustrating a CCD reading operation;

FIG. 21 is a block diagram for illustrating synchronization of RGB signals and the thinning-out interpolation;

FIGS. 23(a) through 23(c) are diagrams illustrating a thinning-out interpolation method; and FIG. 24 is a block diagram illustrating the overall construction of an endoscope imaging apparatus.

DETAILED DESCRIPTION OF THE PREFERRED EMBODIMENTS

Figure 2:
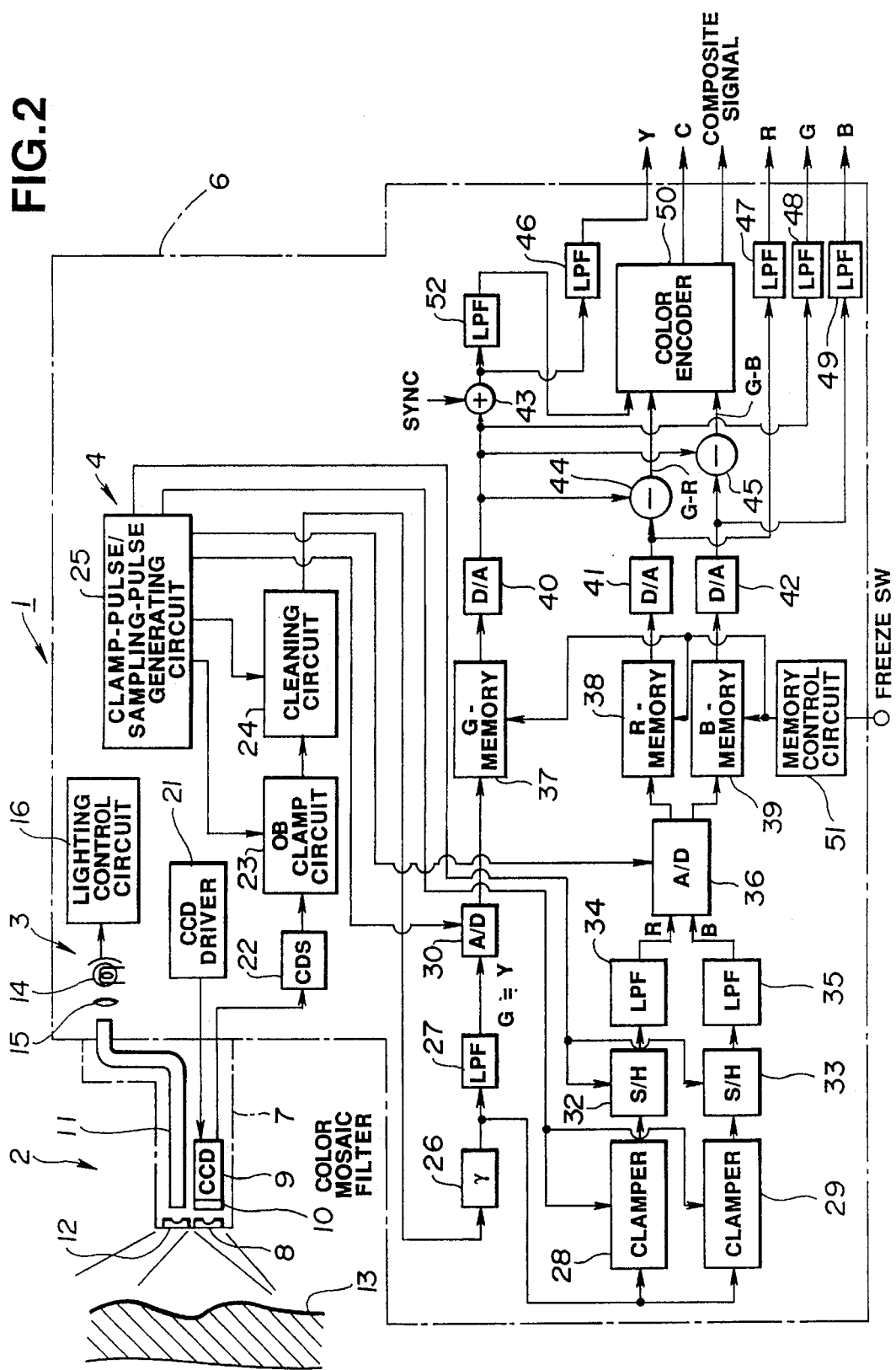

FIGS. 1 and 2 are related to the first embodiment of the present invention, of which FIG. 1 is a diagram illustrating a color-mosaic-filter arrangement according to this embodiment, and FIG. 2 is a block diagram showing the construction of an endoscope imaging apparatus.

First, a solid-state image sensing device according to the first embodiment will be described.

The solid-state image sensing device has a multitude of photodiodes (not shown) which are arranged on an image pick-up surface (not shown) thereof in a matrix-like fashion along a horizontal scanning dimension X and a vertical scanning dimension Y. In total, these photodiodes, which constitute pixels, are arranged approximately 1050 in number as counted along the horizontal scanning dimension X and approximately 1300 in number as counted along the vertical scanning dimension Y. The number of scanning lines of this solid-state image sensing device is approximately twice as large as those of the NTSC and PAL systems, which are 525 and 625, respectively. Therefore, to display an image on a TV monitor of the NTSC or PAL system by using output signals from this image sensing device, two lines as counted along the vertical scanning dimension Y are read out simultaneously and in parallel to obtain one line, whereby the number of scanning lines is made substantially the same, for example, as that of the NTSC system.

FIG. 1 shows an arrangement of the color filters of a color mosaic filter provided on the image pick-up surface of a solid-state image sensing device according to this embodiment. This color mosaic filter has the same number of color filters as that of the photodiodes serving as the photosensitive elements of the solid-state image sensing device, the color filters being respectively opposed to the photodiodes. The color filters of the color mosaic filter constitute pixels together with the photodiodes.

To achieve an improvement in horizontal resolution, one of the two simultaneously read lines along the vertical scanning dimension Y consists of G-filters, which influence the luminance signals most, the remaining line consisting of B and R-filters. Color difference signals G-R and G-B are obtained from the G-signals read out of the first line and the B or R-signals read out of the remaining line.

However, on account of the difference in information amount between R, G and B, which difference is peculiar to an endoscope, the number of B-filters (pixels) is larger than the number of R-filters (pixels). Thus, in the color mosaic filter, the odd (or even) rows as counted along the vertical scanning dimension Y consist of G-filters, and, of the even (or odd) filters, the (3n−2)th and (3n−1)th columns (n=1, 2, 3, ... ) as counted along the horizontal scanning dimension X consist of B-filters, the 3n-th columns consisting of R-filters.

The endoscope imaging apparatus of this embodiment, which is described below, uses a solid-state image sensing device provided with a color mosaic filter as described above. FIG. 2 shows the construction of the electronic imaging apparatus of this embodiment.

Referring to FIG. 2, an endoscope imaging apparatus 1 is provided with an electronic endoscope 2 having a built-in image pick-up means and an apparatus body 6 including a light source section 3 and a signal processing section 4. The light source section 3 supplies illuminating light to the electronic endoscope 2. The signal processing section 4 converts signals from the electronic endoscope 2 into image signals which can be displayed on a display device (not shown).

The electronic endoscope 2 has a thin and narrow insertion section 7 which allows the endoscope to be easily inserted into the body cavity. The front end portion of the insertion section 7 contains an objective lens 8 and a CCD 9, which is a solid-state image sensing apparatus serving as the image pick-up means. Further, a color mosaic filter 10 is attached to the image pick-up surface of the CCD 9. This endoscope, thus constructed, performs an image pick-up operation by the so-called simultaneous system. In the color mosaic filter 10, color filters are arranged in a mosaic-like fashion.

A light guide 11 for transmitting illuminating light is inserted into the insertion section 7. The light guide 11 transmits the illuminating light supplied from the light source section 3 and causes it to be emitted from the front end surface thereof. The illuminating light thus emitted is widened by a flux distribution lens 12 and illuminates an object to be observed 13.

The light source section 3, which supplies illuminating light to that end surface of the light guide 11 which is nearer to the operator, consists of a light source lamp 14 and a lens 15 for condensing the light from the light source lamp 14 upon that end surface of the light guide 11 nearer to the operator. The light source lamp 14 is a white-light source, such as a xenon lamp.

The quantity of illuminating light emitted from the light source lamp 14 is controlled by a lighting control circuit 16.

An image of the object 13, which is illuminated frame-sequentially by the above-mentioned white light, is conveyed through the objective lens 8 and the color mosaic filter 10 to be formed on the image pick-up surface of the CCD 9. This image is read from the CCD 9 as signals obtained through photoelectric conversion by transfer/read-out driving pulses supplied from a CCD driver 21.

The output signals from the CCD 9 are subjected to double sampling at a correlative double sampling circuit (hereinafter abbreviated as "CDS") 22. The CDS 22 removes any 1/f noise and reset noise contained in the output signals read from the CCD so as to output signals improved in terms of S/N ratio. Black level clamping is performed on the output signals by an OB (optical black) clamping circuit 23. Further, the output signals are subjected to optical-black-period and horizontal-ranking-period cleaning by a cleaning circuit 24. The processing operations by the OB clamping circuit 23 and the cleaning circuit 24 are conducted in accordance with the timing of pulses generated by a clamp-pulse/sampling-pulse generating circuit 25.

Next, the output signals, having been conveyed through the cleaning circuit 24, are input to a γ-correction circuit 26 to thereby undergo γ-correction. The γ-correction circuit 26 performs a non-linear (normally, γ=2.2) correction of a photoelectric-conversion type so as to enable an image display to be effected on a display device (not shown).

The signals, having undergone the γ-correction at the γ-correction circuit 26, are input to an LPF (low-pass filter) 27 and, further, can be input to clampers 28 and 29.

The signals from the γ-correction circuit 26 are transmitted through the low-pass filter 27 to become signals from which unnecessary higher harmonics such as CCD carriers have been removed.

To effect one-frame reading with respect to the number of pixels of the CCD 9 (approximately 1050 in number as counted along the horizontal scanning dimension, and approximately 1300 in number as counted along the vertical scanning dimension), a horizontal driving frequency of approximately 50 MHz is required. At the LPF (low-pass filter) 27, a cut-off frequency of approximately 25 MHz is required for passing the luminance signals. The luminance signals and G-signals are substantially equivalent. Actually, G-signals are allowed to pass.

The output signals of the LPF 27 are then input to an A/D converter 30, which performs A/D conversion on the G-line signals only. The A/D-converted digital G-signals consist of 1050 (horizontal)×650 (vertical) items of data, which are stored in a G-memory 37. The A/D conversion is effected with the timing of the pulses generated by the clamp-pulse/sampling-pulse generating circuit 25.

The signals which have undergone γ-correction by the γ-correction circuit 26 are DC-reproduced in pixel units by the clampers 28 and 29 and input to S/H (sample holding circuits) 32 and 33. The S/H circuit 32 performs sample holding on only the R-pixel signals of the output signals of the clamper 28 with S/H clocks of 50/3 MHz, i.e., approximately 16.6 MHz, and outputs them to an LPF 34, which is preset to a cut-off frequency of approximately 8 MHz.

The S/H circuit 33 performs sampling/hold operations with S/H clocks which are advanced in phase by 120° and 240° with respect to the S/H clocks for the R-pixel signals. The signals which have undergone sample/hold operations are input to an LPF 35, which is preset to a cut-off frequency of approximately from 13 MHz to 25 MHz.

The respective frequency bandwidths of the LPFs for G, B and R are set as follows:

LPF 27>LPF 35>LPF 34

This relationship can be expressed in terms of cut-off frequency as follows:

25 MHz>(25~13) MHz>8 MHz

Next, the signals output from the LPFs 34 and 35, i.e., only the signals of B and R-pixels, are A/D-converted by an A/D converter 36. The A/D-converted digital R-signals consist of 350 (horizontal)×650 (vertical) items of data, which are stored in an R-memory 38. The A/D-converted digital B-signals consist of 700 (horizontal)×650 (vertical) items of data, which are stored in a B-memory 39.

Then, the G, R and B-data are simultaneously read out, i.e., synchronized by the the G, R and B-memories 37, 38 and 39. The writing and reading of information to and from the memories 37 through 39 is controlled by a memory control circuit 51. The memory control circuit 51 stops writing of data to the memories 37 through 39 when a freeze SW is turned ON, and outputs a still image.

The G-data read out of the G-memory 37 is converted into an analog G-signal by a D/A converter 40. The R-data read out of the memory 38 is converted into an analog R-signal by a D/A converter 41. The B-data read out of the B-memory 39 is converted into an analog B-signal by a D/A converter 42.

The analog G-signal is input to an LPF 48 and, at the same time, a synchronization signal (sync) is added thereto before it is input to LPFs 46 and 52.

Assuming that the horizontal effective display period for the NTSC TV monitor is approximately 52 μs, the D/A clocks of the D/A converter 40 is 19.2 MHz when approximately 1000 pixels are to be read out. Accordingly, the cut-off frequency of the LPFs 46 and 48 is set to approximately 10 MHz. The output of the LPF 46 is output to the exterior as a luminance signal Y, and the output of the LPF 48 is output the exterior as a G-signal.

The LPF 52 restricts the NTSC bandwidth. The output signal of the LPF 52 is input to a color encoder 50.

The analog R-signal is subtracted by a subtractor 44 from the analog G-signal read out of the G-memory 37, and a color difference signal G-R is calculated by this subtractor 44. Further, the analog B-signal is subtracted by a subtractor 45 from the analog G-signal read out from the G-memory 37, and a color difference signal G-B is calculated by this subtractor 45.

The color encoder 50 synthesizes the color difference signals G-R and G-B with the luminance signal from the LPF 52 to output a carrier chrominance signal C.

The D/A conversion clocks of the D/A converters 41 and 42 are 6.7 MHz and 13.5 MHz, respectively, and the cut-off frequencies of the LPF 47 and 48 are set to approximately 3.5 MHz and approximately 7 MHz, respectively. The outputs of the LPFs 47 and 49 are output to the exterior as R and G-signals.

Here, the LPF cut-off frequencies of these LPFs are set to satisfy the following condition: LPF 46=LPF 48>LPF 49>LPF 47. That is, 10 MHz>7 MHz>3.5 MHz In the case of an NTSC signal, the horizontal resolution per 1 MHz is approximately 80 TV-line, so that a horizontal resolution of approximately 800 TV-line can be secured for the luminance signal Y and the G-signal. Regarding the R and B-signals, horizontal resolutions of approximately 280 TV-line and 560 TV-line, respectively, are required. The respective marginal horizontal resolutions of Y, G, R and B-signals differ in correspondence with the difference in information amount between R, G and B, which is peculiar to endoscopic images. The above-mentioned resolutions, however, are sufficient for obtaining the endoscopic image.

As stated above, in this embodiment, the following relationship is established regarding the number of pixels of the CCD 9: the number G-component pixels≧the number of B-component pixels>the number of R-component pixels. The number of pixels of the CCD 9 is set at the irreducible minimum in accordance with the characteristic in terms of information amount of the endoscopic image. In the signal processing section 4, a plurality of LPFs for realizing the relationship: G-component band≧B-component band>R-component band, whereby the B-component is made equal to or less than the G-component and more than the R-component in order that an image signal resolution which is high enough to display an endoscopic image may be obtained.

Further, this arrangement makes it possible to realize a reduction in the size of the front end section of the endoscope and a reduction in the size of the apparatus body 6 due to the reduction in memory capacity inside the signal processing section 4 and, further, a high level of resolution can be secured.

While in the example shown the solid-state image sensing device, constituting the image pick-up means, is provided at the front end of the insertion section of the electronic endoscope 2, the invention is not restricted to this structure.

Figure 15:
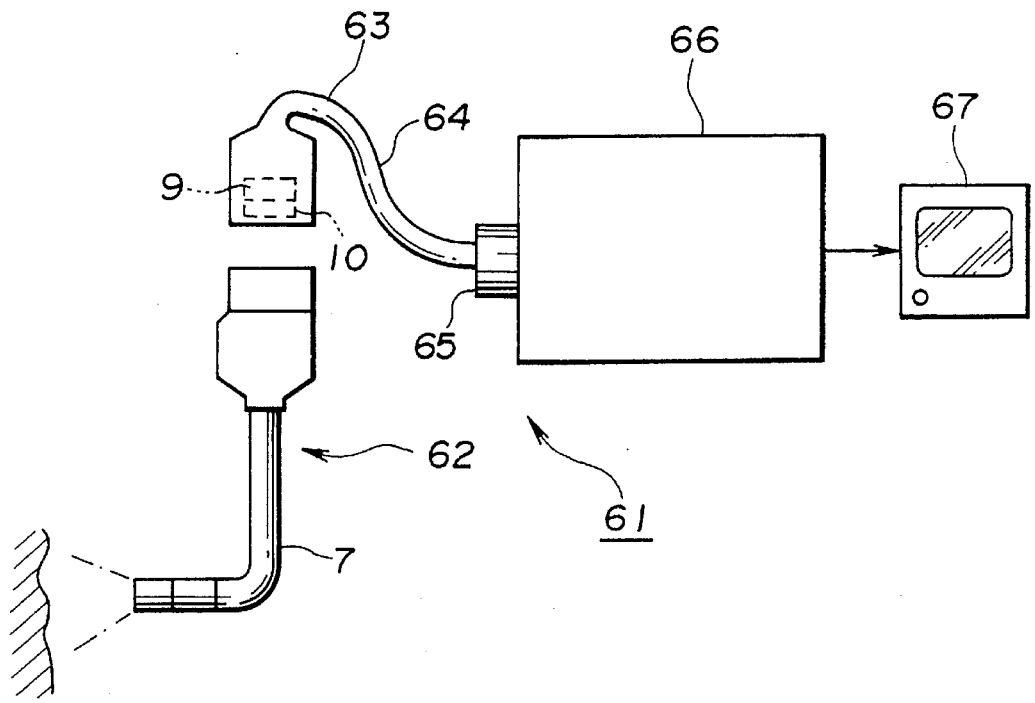
FIG. 15 is a diagram showing a construction example in which a solid-state image sensing device is provided outside an endoscope.

For example, as shown in FIG. 15, the image pick-up means may also be an external TV camera 63 for endoscopes, which is attached to the eyepiece section of an optical fiber endoscope 62. The endoscope apparatus shown in FIG. 15 includes: an endoscope 62; a TV camera 63 containing a CCD 9; an apparatus body 66 containing a light source device 3 and a signal processing section 4; and a monitor 67. A cable 64 extends from the TV camera 63, which is connected to the apparatus body 66 through a connector 65 provided at one end of the cable 64. With this apparatus, it is possible to realize a reduction in the size of the head section of the external TV camera 63.

Next, FIGS. 3(a) through 3(d) show a color-mosaic-filter arrangement according to the second embodiment of the present invention, and the way data is written to the memories in this embodiment.

As shown in FIG. 3(a), in the color mosaic filter of this embodiment, the odd (or even) rows consist of G and R-filters, of which the (3n−2)th and (3n−1)th columns (n=1, 2, 3, . . . ) consist of G-filters and the 3n-th filters consist of R-filters. Further, in the color mosaic filter of this embodiment, the even (or odd) rows consist of B and G-filters, of which the (3n−2)th and (3n−1)th columns consist of B-filters, and the 3n-th columns consist of G-filters.

A signal processing operation similar to that of the signal processing section 4 shown in FIG. 2 is conducted with respect to a CCD to which the color mosaic filter of FIG. 3, having the above-described filter arrangement, is attached. Data is written to the R, G and B-memories 37 through 39 in the way shown in FIGS. 3(b), 3(c) and 3(d), respectively. The reading-out of information is conducted in the same way as in the first embodiment, and so is the signal processing on the output side.

Apart from the above, the construction and effects of this embodiment are the same as those of the first one, so a description thereof will be omitted.

Next, FIG. 4 shows a color-mosaic-filter arrangement according to the third embodiment of the present invention.

As shown in FIG. 4, in the color mosaic filter of this embodiment, the odd (or even) rows consist of G and B-filters, of which the (3n−2)th and (3n−1)th columns (n=1, 2, 3, . . . ) consist of G-filters, and the 3n-th columns consist of B-filters. Further, in the color mosaic filter of this embodiment, the even (or odd) rows consist of R, G and B-filters, of which the (3n−2)th columns consist of B-filters, the (3n−1)th columns consist of R-filters, and the 3n-th columns consist of G-filters.

The B-filters in the (3n−2)th columns and the R-filters in the (3n−1)th columns are interchangeable. Further, the R and B-filters may be interchanged for each field.

The signal processing in this embodiment is the same as that in the first one. Apart from the above, the construction and effects of this embodiment are the same as those of the first one, so a description thereof will be omitted.

Next, FIG. 5 shows a color-mosaic-filter arrangement according to the fourth embodiment of the present invention.

As shown in FIG. 5, in the color mosaic filter of this embodiment, the filters in the (2n−1)th columns of the filters constituting the odd (or even) rows are G-filters, and those in the (6n−4)th columns are R-filters, the rest being B-filters. Further, in the color mosaic filter of this embodiment, the filters in the 2n-th columns of the filters constituting the even (or odd) rows are G-filters, and those in the (6n−1)th columns are R-filters, the rest being B-filters. The above-described filter arrangement, however, should not be construed restrictively. It is also possible to interchange the R and B-filters diagonally adjacent to each other. Further, the R and B-filters may be interchanged for each field. Apart from the above, the construction and effects of this embodiment are the same as those of the first one, so a description thereof will be omitted.

Next, FIG. 6 shows a color-mosaic-filter arrangement according to the fifth embodiment of the present invention.

As shown in FIG. 6, in the color mosaic filter of this embodiment, the (6n−5)th, the (6n−4)th and the (6n−3)th columns of the odd (or even) rows consist of G-filters, and the rest of the odd rows consist of B and R-filters arranged in the proportion of B:R=2:1. Further, in the color mosaic filter of this embodiment, the (6n−2)th, the (6n−1)th and the 6n-th columns of the even (or odd) rows consist of G-filters, and the rest of the even rows consist of B and R-filters arranged in the proportion of B:R=2:1.

The R-filters are arranged in the 6n-th columns of the odd (even) rows, and the (6n−3)th columns of the even (or odd)

rows. Apart from the above, the construction and effects of this embodiment are the same as those of the first embodiment, so a description thereof will be omitted.

The arrangement of R-filters is not restricted to that shown in FIG. 6. It is also possible to adopt modifications as shown in FIGS. 7 and 8. In the arrangement shown in FIG. 7, the R-filters are arranged in the (6n−1)th columns of the odd (or even) rows, and in the (6n−4)th columns of the even (or odd) rows. In the arrangement shown in FIG. 8, the R-filters are arranged in the (6n−2)th columns of the odd (or even) rows and in the (6n−5)th columns of the even (or odd) rows. The invention is not restricted to this arrangement, however, because it is also possible to interchange the R and B-filters for each field.

Next, FIG. 9 shows a color-mosaic-filter arrangement according to the sixth embodiment of the present invention.

As shown in FIG. 9, in the color mosaic filter of this embodiment, the first n columns of the odd (or even) rows consist of G-filters, and the next n columns thereof consist of B and R-filters arranged in the proportion: B:R=2:1. This pattern is repeated in the following columns. At the same time, the first n columns of the even (or odd) rows consist of B and R-filters arranged in the proportion: B:R =2:1, and the next n columns thereof consist of G-filters. This pattern is also repeated.

Apart from the above, the construction and effects of this embodiment are the same as those of the first embodiment, so a description thereof will be omitted.

FIG. 10 shows a color-mosaic-filter arrangement according to the seventh embodiment of the present invention.

As shown in FIG. 10, in the color mosaic filter of this embodiment, the (3n−2)th and (3n−1)th columns of the odd (or even) rows consist of G-filters, the (6n−3)th columns thereof are R-filters, and the 6n-th columns thereof are B-filters. Further, the (3n−2)th and (3n−1)th columns of the even (or odd) rows consist of B-filters, the (6n−3)th columns thereof consist of G-filters, and the 6n-th columns thereof consist of R-filters.

By using a CCD provided with this color mosaic filter, a signal processing operation is performed in the signal processing section 4 shown in FIG. 2 in the same manner as in the first embodiment. However, since the G and B bandwidths are equivalent, the following relationship is preset in this embodiment: LPF 27=LPF 35>LPF 34, and LPF 46=LPF 48=LPF 49>LPF 47. As for the memory capacities, G-memory 37=B-memory 38>R-memory 39. The horizontal resolution at this time is approximately 680 TV-line for the luminance signal Y, G-signal and B-signal, and approximately 270 TV-line for the R-signal.

Thus, in this embodiment, it is possible to reduce the memory capacities and to obtain high resolution. Apart from the above, the construction and effects of this embodiment are the same as those of the first embodiment, so a description thereof will be omitted.

The color-mosaic-filter arrangement is not limited to the one shown in FIG. 10. Any arrangement is acceptable as long as it satisfies the following condition: the number of G-pixels=the number of B-pixels>the number of R-pixels; and the signal processing section 4 can be adapted to any of such arrangements.

Further, in the filter arrangements of the first through seventh embodiments described above, the G-filters may be replaced by W-filters transmitting white light as a complementary-color-type component. In that case, however, the difference in sensitivity between the W, R and B-filters is considerably large, so that it is desirable that ND-filters be provided in parallel with the W-filters so as effect sensitivity adjustment.

While the above embodiments have been described with reference to a color mosaic filter of R, G and B, the colors are not restricted to the three primary colors. It is also possible to adopt a complementary-color-type color mosaic filter, as in the embodiment described below.

Figures 11, 12:
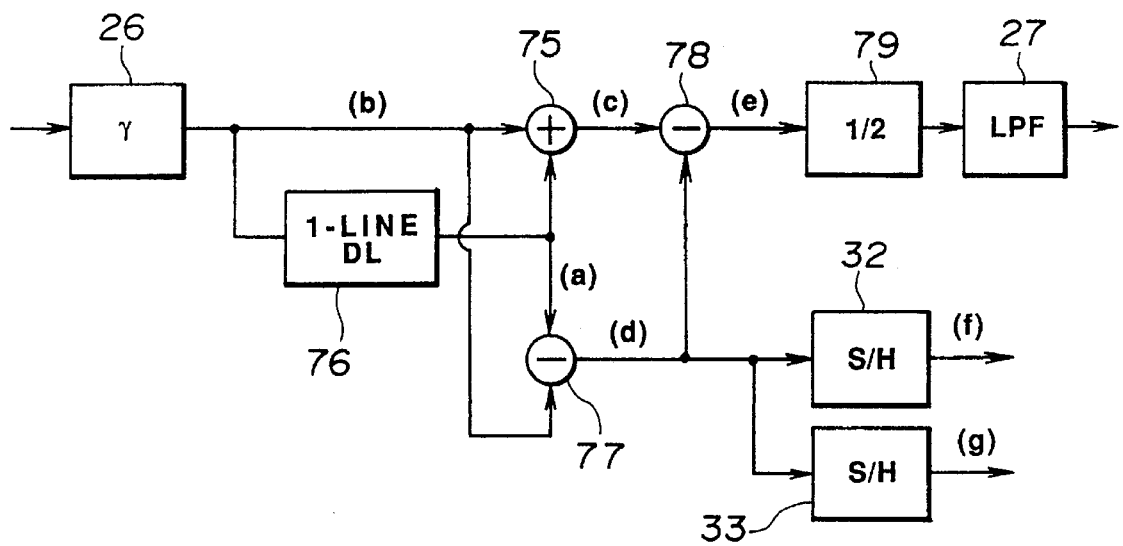
FIG. 11 is a diagram showing a color-mosaic-filter arrangement according to an eighth embodiment of the present invention.
FIG. 12 is a block diagram showing a matrix circuit provided on the output side of a correction circuit.

FIG. 11 shows a color-mosaic-filter arrangement according to the eighth embodiment of the present invention.

As shown in FIG. 11, the filter arrangement of this embodiment differs from that of FIG. 1 in that the B-filters are replaced by filters of Cy (cyan) as a first complementary-color component, and the R-filters are replaced by filters of Ye (yellow) as a second complementary-color component. In this embodiment, color separation is effected by means of a matrix circuit shown in FIG. 12, which is provided on the output side of the γ-correction circuit 26 shown in FIG. 2. FIGS. 13(a) through 13(g) illustrate the operation of this matrix circuit.

This matrix circuit has an adder 75 to which the signals γ-corrected by the γ-correction circuit 26 are input, and a 1-line delay (DL) circuit 76. The adder 75 adds the output of the first row, as shown in FIG. 13(a) and the output of the second row, as shown in FIG. 13(b) to output a signal as shown in FIG. 13(c).

A subtractor 77 subtracts the signal shown in FIG. 13(a) from the second-row output shown in FIG. 13(b) to output a signal as shown in FIG. 13(d).

A subtractor 78 subtracts the signal shown in FIG. 13(d) from the output shown in FIG. 13(c) to output a signal as shown in FIG. 13(e). The output of the subtractor 78 is conveyed through a ½ circuit 79 for halving gains and input to the LPF 27.

The output of the subtractor 77 is conveyed through the S/H circuits 32 and 33 and output as signals as shown in FIGS. 13(f) and 13(g).

Apart from the above, the construction and effects of this embodiment are the same as those of the first one, so a description thereof will be omitted.

Further, while the above-described matrix circuit was of an analog type, it may also be of a digital type.

Next, FIG. 14 shows a color-mosaic-filter arrangement according to a ninth embodiment of the present invention.

As shown in FIG. 14, the filter arrangement of this embodiment differs from that of the second embodiment shown in FIG. 3 in that the B-filters are replaced by Cy-filters, and the R-filters are replaced by Ye-filters. As for the signal processing in this embodiment, it is substantially the same as that in the eighth embodiment, so a description thereof will be omitted.

Similarly, also in the RGB color mosaic filters of the embodiments shown in FIGS. 4 through 10, the same effect can be obtained by replacing the B-filters by Cy-filters and the R-filters by Ye-filters.

Figure 16:
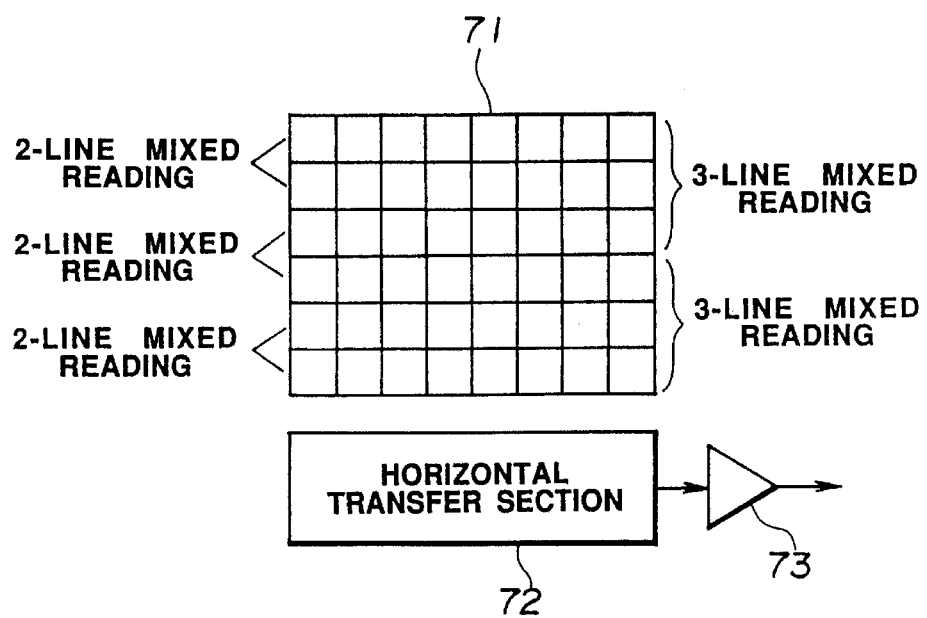
FIG. 16 is a schematic diagram showing the construction of a frame-sequential-type solid-state image sensing device according to a tenth embodiment of the present invention.

Although the above-mentioned embodiments have been described with reference to filter arrangements for a simultaneous-type imaging apparatus, the constructions of these embodiments are also applicable to frame-sequential-type imaging apparatuses. FIG. 16 shows a solid-state image sensing device for use in a frame-sequential-type imaging apparatus, which constitutes the tenth embodiment of the present invention.

The solid-state image sensing device shown in FIG. 16 has an image pick-up section 71 in which a multitude of photodiodes are arranged in a matrix-like fashion, a horizontal transfer section 72 for transferring the electric charge accumulated in the multitude of photodiodes in the image pick-up section 71, and a buffer section 73 for outputting the signals sequentially read out of the horizontal transfer section 72 to the exterior.

The G and B-signals, picked up frame-sequentially, are read by the normal reading method, whereas the R-signals are read by the 2-line-mixed reading method. This makes it possible to shorten the read-out time, whereby the exposure time can be lengthened, thereby attaining an improvement in brightness.

The signal reading may also be performed so that the G-signals are read by the normal reading method, whereas the B and R-signals are read by the 2-line and 3-line-mixed reading methods, respectively, whereby the same effect as described above can be obtained.

Figure 17:
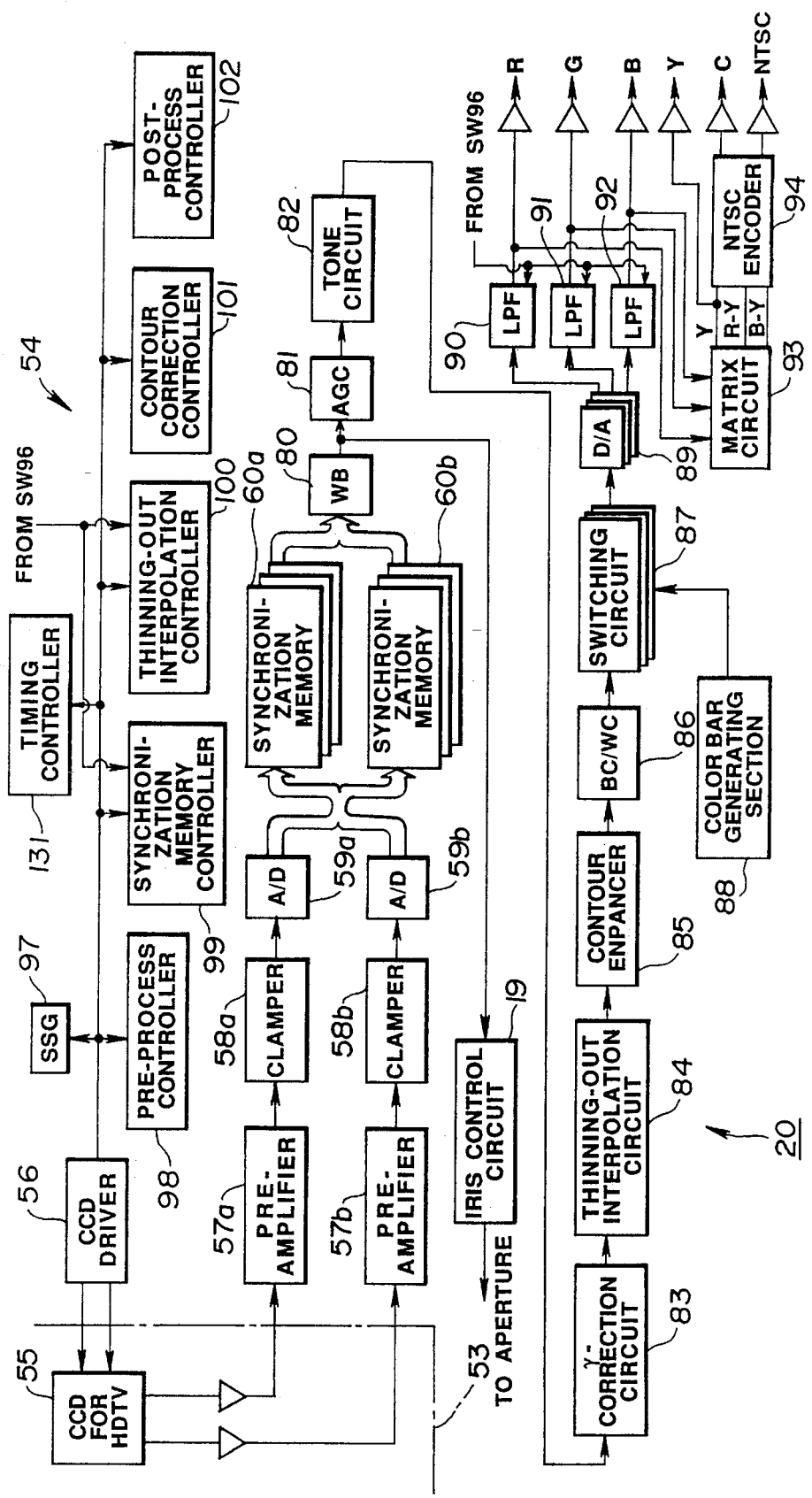
Figure 18:
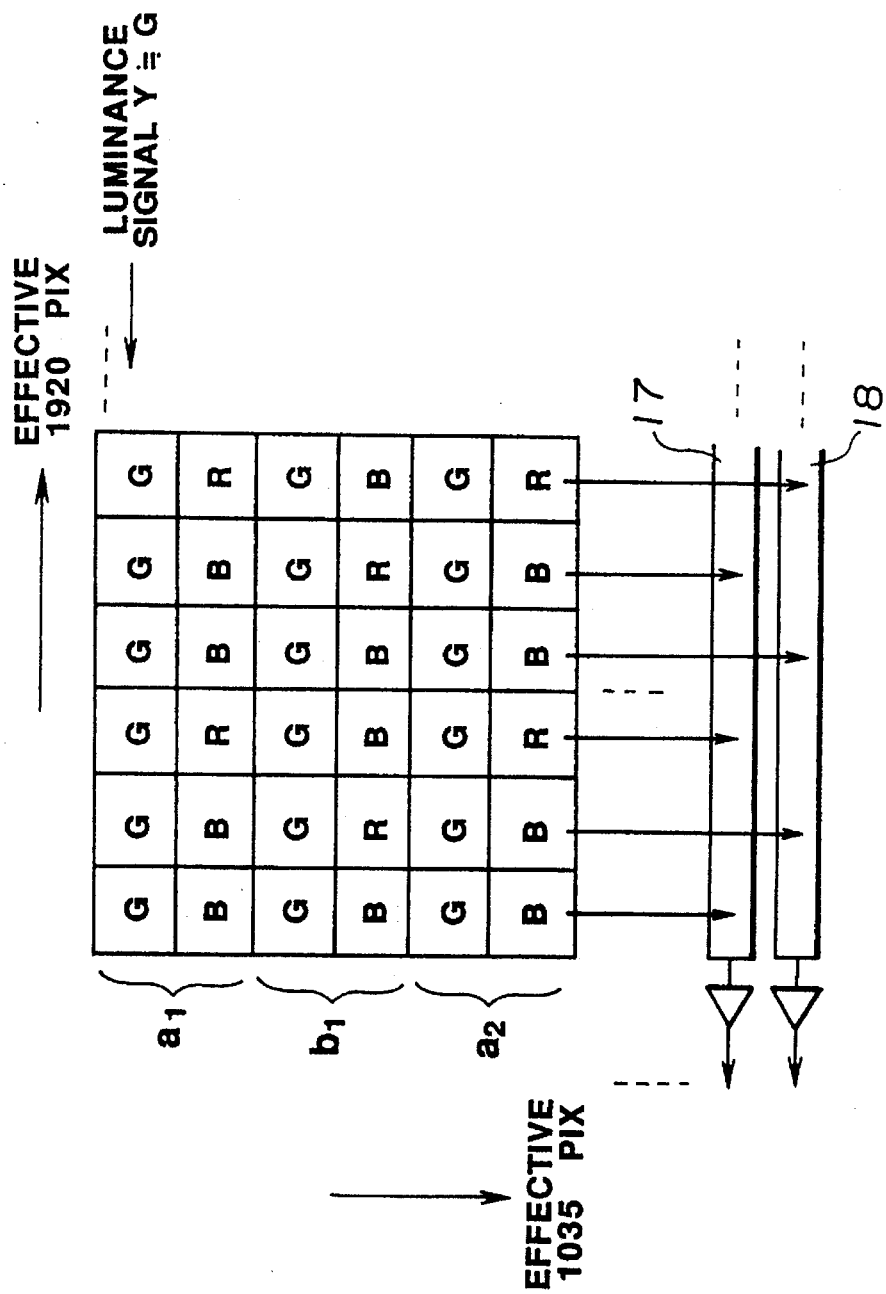
Figure 19:
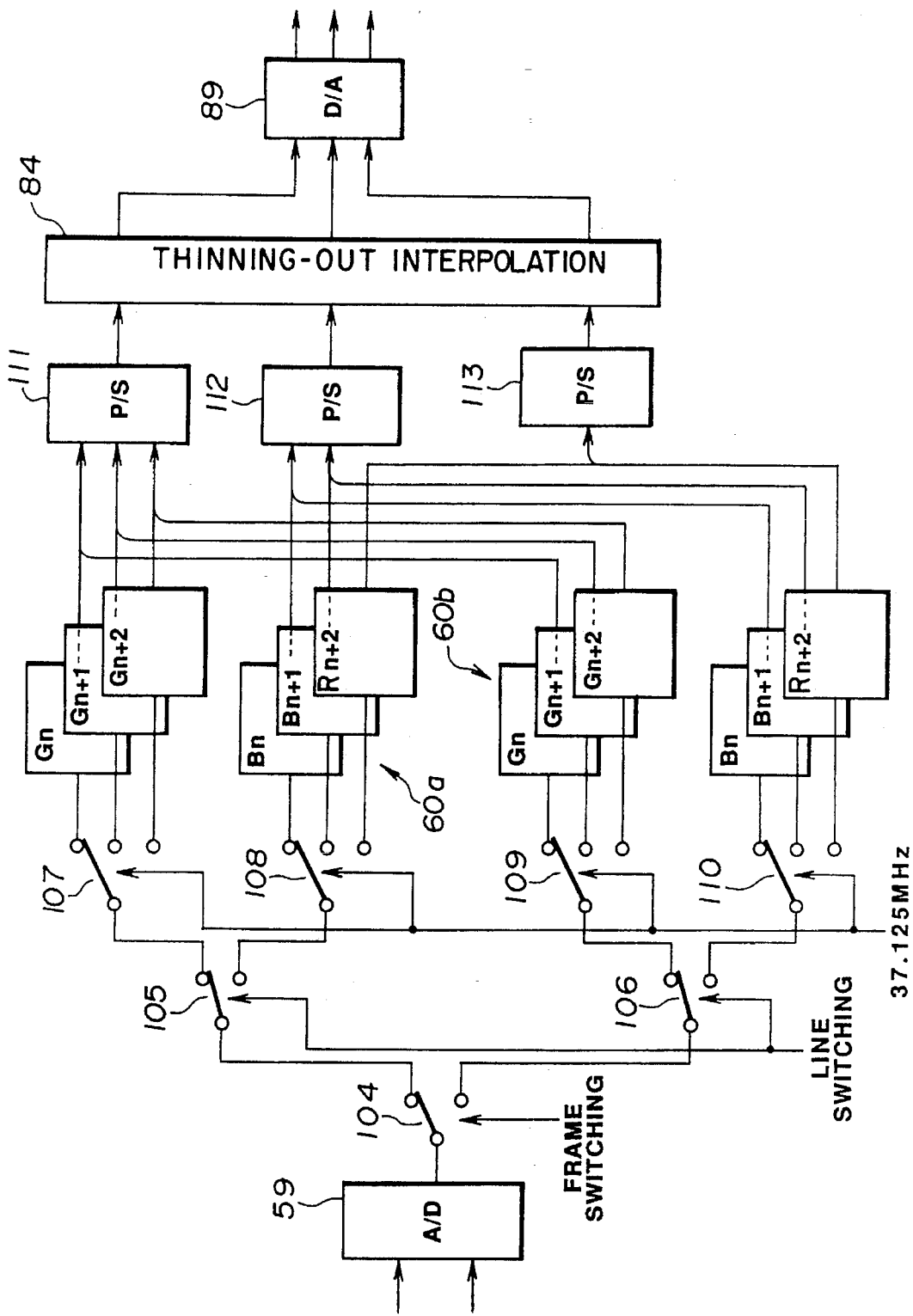
Figures 20, 24:
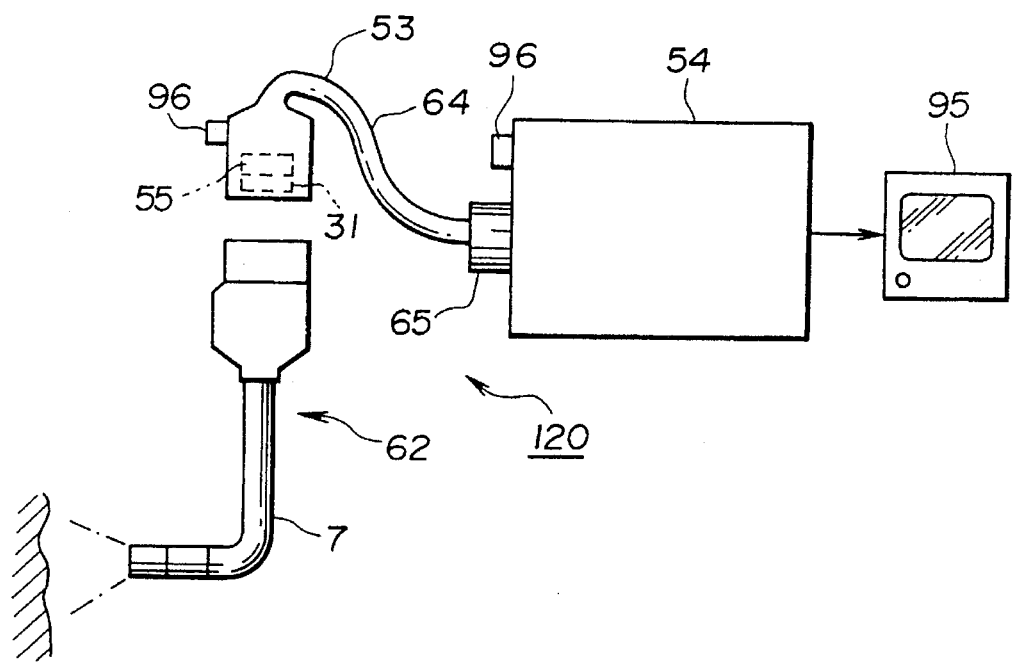
Figure 21:
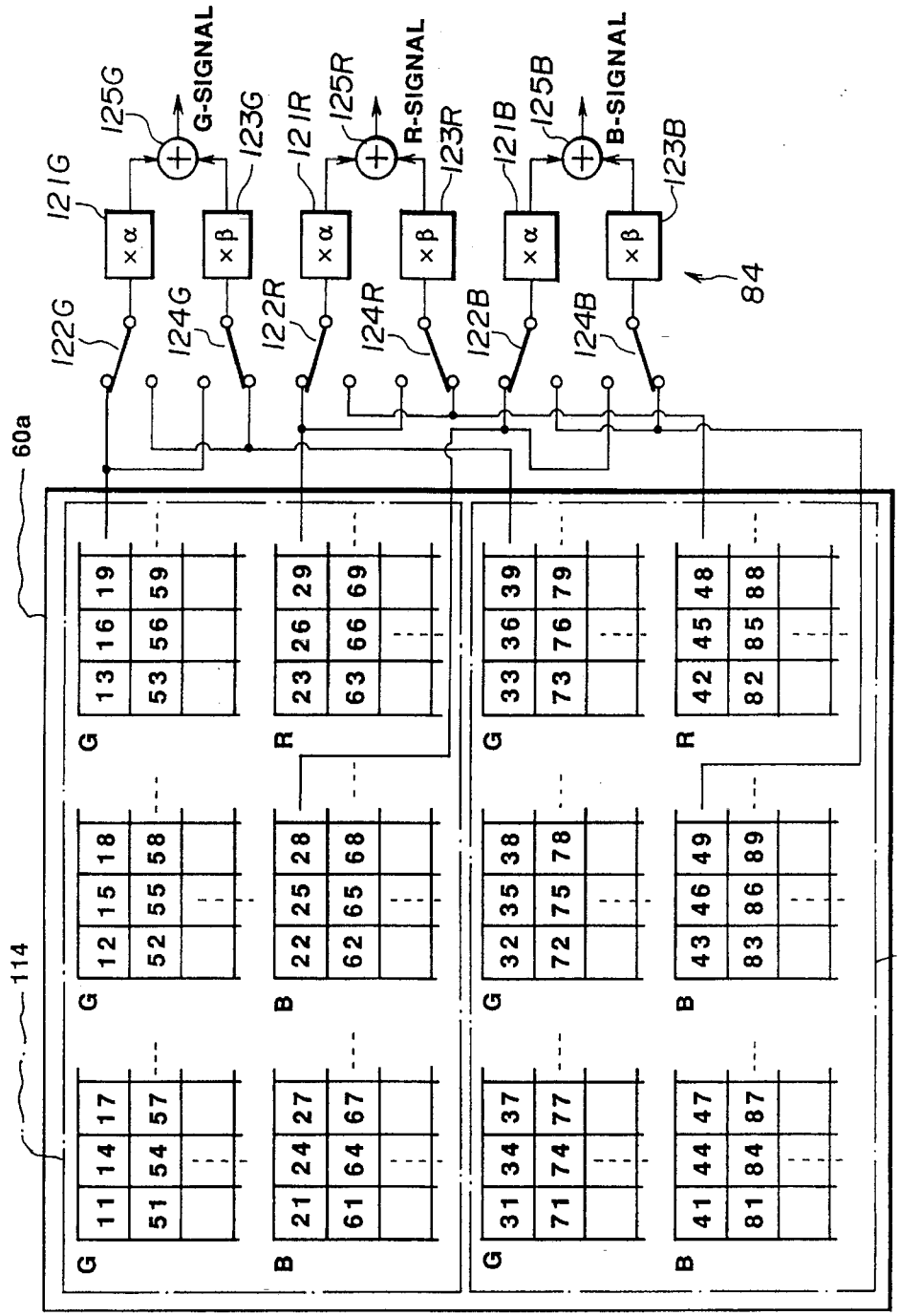

FIGS. 17 through 24 relate to the tenth embodiment of the present invention, of which FIG. 17 is a block diagram showing the construction of an endoscope imaging apparatus; FIG. 18 is a diagram illustrating a CCD reading operation; FIG. 19 is a block diagram illustrating the operation of synchronization memories and a thinning-out interpolation; FIG. 20 is a diagram illustrating CCD reading; FIG. 21 is a block diagram illustrating synchronization of RGB signals and thinning-out interpolation; FIGS. 22(a) through 22(c) are diagrams illustrating picture planes prior to thinning-out and displays after that; FIGS. 23(a) through 23(c) are diagrams illustrating a thinning-out interpolation method; and FIG. 24 is a diagram showing the overall construction of an endoscope imaging apparatus.

The endoscope imaging apparatus 20 shown in FIG. 17 resembles the one shown in FIG. 15 in overall construction. However, the former uses a single-plate, high-resolution TV camera, which leads to differences in these apparatuses in the construction of the signal processing section. Apart from the above, the construction and effects of this embodiment are the same as those of the first one, so a description thereof will be omitted, and only those features thereof will be described which distinguish the one from the other.

The endoscope imaging apparatus 20 shown in FIG. 17 includes a high-resolution, single-plate TV camera 53, a CCU (camera control unit) 54, and a TV monitor 95 having an aspect ratio of 4:3. The high-resolution single-plate TV camera 53 can be attached to the eyepiece section of an optical fiber endoscope 62. Further, the imaging apparatus 20 has SW (switches) 96 at the head of the camera and on the front panel of the CCU 54, the SW 96 serving as a switching instruction means for changing the display area in order that the imaging range of the high-resolution TV camera 53 may be adapted to the display area of the TV monitor 95. When these switches SW 96 are operated, the resolution of the display image is changed and, at the same time, the thinning-out interpolation described below is changed.

It is possible for the SW (switch) 96 to be provided either only at the head of the camera (or of the electronic endoscope) or on the front panel of the CCU 54.

A high-resolution solid-state image sensing device as shown in FIG. 18 is mounted at the front end of the head of the TV camera 53. The reading of this image sensing device can be effected by horizontal shift registers 17 and 18, which respectively correspond to the odd and even pixels as counted along the horizontal dimension. Actually, a CCD 55 for HDTV (high definition television) is used as the solid-state image sensing device, which has two million pixels (1920 effective pixels as counted along the horizontal dimension and 1035 effective pixels as counted along the vertical dimension). To effect 1-frame reading of these pixels, a reading frequency of 37.125 MHz is necessary for the above-mentioned reading (2-shift-register reading). Accordingly, horizontal transfer clocks having a frequency of 37.125 MHz are transmitted to the CCD 55 from a CCD driver 56 of the CCU 54 of FIG. 17.

As shown in FIG. 18, the color mosaic filter 31 provided on the front surface of the CCD 55 has the same color-filter arrangement as that of the first embodiment, although it has a greater number of color filters. That is, the color-filter ratio G:B:R=3:2:1, the odd lines consisting of G-signals, and the even lines consisting of BBRs in a repeated pattern. By means of synchronization memories described below, synchronization of G, B and R can be effected on the electric signals obtained by photoelectrically converting the light transmitted through the color filters. Each frame is composed of a and b-fields. The (4n–3)th and (4n–2)th rows constitute the a-fields, and the (4n–1)th and 4n-th rows constitute the b-fields (n=1, 2, 3, . . . ).

The output signals from the CCD 55 are transmitted through cables and buffers and input to pre-amplifiers 57a and 57b in the CCU 54, and are then conveyed by way of A/D converters 59a and 59b before undergoing RGB synchronization by synchronization memories 60a and 60b. The synchronized signals are adjusted by a WB (white balance) circuit 80 in terms of white balance, and by an AGC (auto gain control) circuit 81 in terms of gain. The output of the white balance circuit 80 is also supplied to an iris control circuit 19, which controls the aperture of a light source section (not shown).

Further, the output of the AGC circuit 81 undergoes tone correction by a tone circuit 82 and γ-correction by a γ-correction circuit 83 before it undergoes thinning-out interpolation by a thinning-out interpolation circuit 84. The output of the thinning-out interpolation circuit 84 is subjected to contour enhancement by a contour enhancer 85, and then conveyed through a BC/WC (black-clip/white-clip) circuit 86 before it is input to a switching circuit 87. The BC/WC circuit 86 clips excessive whisker signals of the contour-enhanced signals. The switching circuit 87 is also connected to a color bar generating section 88 for generating color bar signals.

The switching circuit 87 selectively outputs either the color bar signals from the color bar generating section 88 or the output of the BC/WC circuit 86. The output thus selected by the switching circuit 87 is restored to R, G and B analog signals by a D/A converter 89. After that, RGB analog signals are output through LPFs 90, 91 and 92 serving as changing means and through buffers.

The respective cut-off frequencies of the LPFs 90, 91 and 92 can be changed in accordance with the changing of the SW 96.

The respective RGB outputs from the LPF 90 through 92 are input to a matrix circuit 93, where they undergo conversion into a luminance signal Y and color difference signals R-Y and B-Y. As shown in FIG. 18, Y is approximately equal to G, so that the matrix circuit 93 generates R-G and B-G as color difference signals. The matrix circuit 93 may also be so designed that it obtains a luminance signal Y' from RGB, and then obtains color difference signals R-Y ad G-Y'.

The luminance signal Y (which is approximately equal to G) from the matrix circuit 93 is output to the exterior through buffers. Further, this luminance signal Y and the color difference signals R-Y and B-Y are input to an encoder circuit 94. The encoder circuit 94 converts the above-mentioned RGB signals and synchronization signals into a composite synchronization signal for an NTSC system and a color carrying signal C.

The above-mentioned circuit is controlled by a plurality of circuits described below.

A driving signal generated by an SSG (synchronous signal generator) 97 is converted to a predetermined voltage by the CCD driver 56 and is output. A pre-process controller 98 controls the pre-amplifiers 57a and 57b, the clampers 58a and 58b, and the D/A converters 59a and 59b.

A synchronization memory controller 99 controls the synchronization memories 60a and 60b. The memories 60a and 60b can be switched between a plurality of writing (or reading) areas by operating the SW 96 connected to the synchronization memory controller 99. That is, different areas of the above-described memories are used in accordance with the pixels used, as described below.

A thinning-out interpolation controller 100 controls the thinning-out interpolation of the thinning-out interpolation circuit 84. The thinning-out interpolation can be switched between a plurality of modes by operating the SW 96 connected to the thinning-out interpolation controller 100.

A contour enhancement controller 101 controls the contour enhancer 85. A post-process controller 102 controls the circuits on the output side, such as the white balance circuit 80 and the D/A converter 89.

A timing controller 131 supplies timing pulses to the SSG 97 and the controllers connected through a bus line.

The operation of the synchronization memories and the thinning-out interpolation will be described in detail with reference to FIGS. 19 through 23.

FIG. 19 shows a portion of the circuit of FIG. 17 which is around the synchronization memories and the thinning-out interpolation circuit, with the WB circuit 80 and the γ-correction circuit 83 omitted.

The signals from the A/D converters 59a and 59b can be switched for each frame to either the frame memory 60a or 60b by a frame change-over switch 104.

The frame memories 60a and 60b are so constructed that their memory capacities are in the following proportion: G:B:R=3:2:1. A change-over switch 105 (or 106) effects line switching between the G and BBR lines for each read-out line of the CCD. At the same time, when a G-line is selected, a change-over switch 107 (or 109) stores information in each G-memory for each 37.125 MHz. Also, in the case of a BBR line, a change-over switch 108 (or 110) operates in a similar manner.

The synchronization memory controller 99 supplies a frame switching signal to the change-over switch 104, a line switching signal to the change-over switch 105, 106, and writing clocks of 37.125 MHz to the change-over switches 107 through 110.

Reading from the synchronization memories is conducted from the memory other than the one to which the above-described writing is being performed, and this is alternately repeated. The reading is performed in parallel through parallel/serial ports 111 through 113, and the read-out signals undergo serial conversion and are input to the thinning-out interpolation circuit 84 on the output side.

FIG. 21 shows the construction of the storage section of the synchronization memory 60a with resect to the pixel arrangement of the CCD 55 shown in FIG. 22. The frame memory 60a for synchronization is composed of field memories 114 and 115. The G-numerals 11, 14, 17, . . . in FIG. 21 indicate signals picked up by the pixels G11, G14, G17, . . . shown in FIG. 20 and stored. A similar relationship applies to B and R. The synchronization memory 60b has a similar construction to that described above.

FIG. 21 schematically shows the connection between the thinning-out interpolation circuit 84 and the synchronization memory 60a. In the thinning-out interpolation circuit 84, data stored in the G-storage sections of the field memories 114 and 115 is selectively input to a multiplier 121G through a switch 122G. Further, data stored in the G-storage sections of the field memories 114 and 115 is selectively input to a multiplier 123G through a switch 124G. The multiplier 121G multiplies the input data by $\alpha$, whereas the multiplier 123G multiplies the input data by $\beta$. An adder 125G adds the input data multiplied by $\alpha$ by means of the multiplier 121G and the input data multiplied by $\beta$ by means of the multiplier 123G. The coefficients $\alpha$ and $\beta$ of the multipliers 121G and 123G can be switched by the thinning-out interpolation controller 100. It is also possible to adopt a construction in which switching is possible between a plurality of multipliers having different coefficients.

The multiplication and addition of the data stored in the B and R-storage sections can also be effected in a manner similar to the one described above.

Next, the method of thinning-out interpolation will be described with reference to FIGS. 22(a) through 22(c) and 23(a) through 23(c).

Figure 22A:
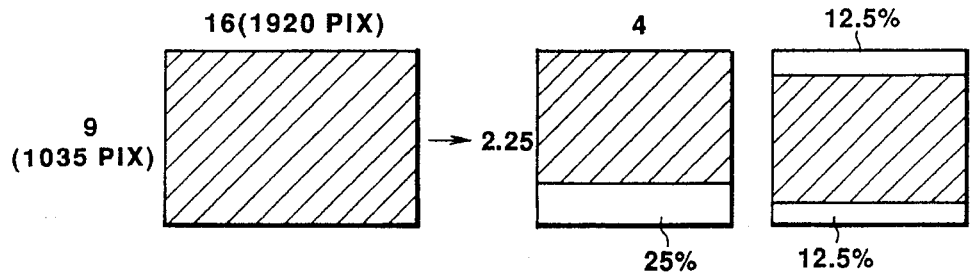
FIGS. 22(a) through 22(c) are diagrams illustrating picture planes before thinning-out and displayed picture planes after thinning-out.

In FIG. 22(a), all of the CCD pixels having an aspect ratio of 16:9 are used. On an existing TV set, the display area along the vertical dimension is 75%, which means distortion would be involved if display is effected without performing thinning-out. Thus, it is necessary in this case to effect thinning-out interpolation from 4-line to 3-line.

FIGS. 23(a) through 23(c) illustrate specific examples of the thinning-out interpolation.

In this case, a thinning-out performed by simply eliminating one of the four lines would result in the generation of a zigzag distortion for each of the three lines. In view of this, as shown in FIG. 23(a), coefficient-multiplication is effected on certain lines and then addition is conducted on them, thereby preventing the distortion mentioned above.

In the drawings, symbol o indicates the (4n+1)th lines, and symbol X indicates the (4n+3)th lines of the CCD pixels, both categories of lines being G-lines. Lines 1, 17, . . . of the (4n+1)th lines constitute as they are the odd-field lines of the display monitor (indicated by black-filled circles in the drawing). Lines 9, 25, . . . of the (4n +1)th lines constitute as they the even-field lines of the display monitor (indicated by symbol Δ in the drawing). (n=1, 2, 3, . . . )

The data of the (4n+3)th lines is multiplied by $7/10$ by the multiplier 121. The remaining data of the (4n+1)th lines is multiplied by $3/10$ by the multiplier 122. The data multiplied by $7/10$ by the multiplier 121 and the data multiplied by $3/10$ by the multiplier 122 are added by the adder 125 to become data on the above-mentioned odd or even-fields. For example, 3-line data multiplied by $7/10$ and 5-line data multiplied by $3/10$ are added to become odd-field data. Similarly, 5-line data multiplied by $3/10$ and 7-line data multiplied by $7/10$ are added to become even-field data.

BBR-line data is multiplied and added in a similar manner to effect thinning-out interpolation.

In this way, conversion from 4-line to 3-line is effected. The display range of the endoscopic image indicated by the shaded portion in FIG. 22(a) has an aspect ratio of 4:2.25 and is displayed so as to be positioned substantially at the center of the picture plane.

Figure 22B:
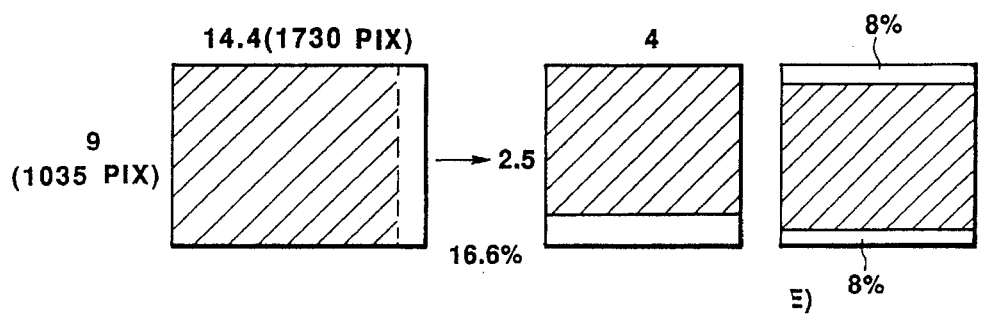

As shown in FIG. 22(b), also in the case in which approximately 90% of the pixels of the CCD 55 with respect to the horizontal dimension are used (with an aspect ratio of 14.4:9), a similar operation is conducted. In this case, thinning-out conversion is effected from 6-line to 5-line. Specifically, as shown in FIG. 23(b), lines 1, 13, 25, . . . of the (4n+1)th lines alternately constitute the odd/even-field lines. The first even-line data is obtained by adding the (4n+3)th-line data multiplied by $4/5$ and the (4n+3)th-line data multiplied by $1/5$.

Next, the data on the second even line is obtained by adding the (4n+3)th-line data multiplied by $2/5$ and the (4n+1)th-line data multiplied by ⅗. Further, the third odd-line data is obtained by adding the (4n+1)th-line data multiplied by ⅕ and the (4n+3) data multiplied by ⅘. A similar operation is repeated.

Also, regarding the BBR-line data, multiplication and addition are performed in a similar manner to effect thinning-out interpolation.

In this way, conversion from 6-line to 5-line is effected. The display range of the endoscopic image, represented by the shaded portion in FIG. 22(b), has an aspect ratio of 4:2.5 and is displayed substantially at the center of the picture plane.

In the conversion method shown in FIG. 22(b), four weighting coefficients (⅕, ⅖, ⅗ and ⅘) are required. When the coefficient ⅖ is replaced by ⅕, and the coefficient ⅗ by ⅘, the number of coefficients is reduced to two, thereby simplifying the circuit.

Figure 22C:
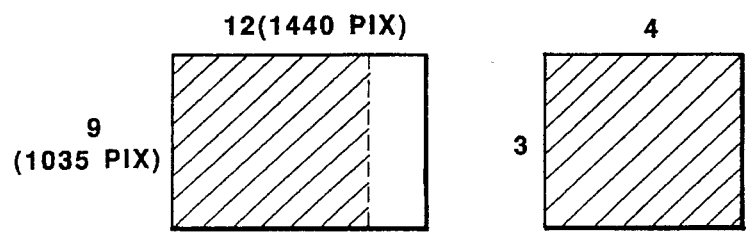

Further, when, as shown in FIGS. 22(c) and 23(c), approximately 75% with respect to the horizontal dimension of the pixels of CCD 55 (with an aspect ratio of 12:9) are used, they can be displayed as they are in the proportion of 4:3 without effecting any thinning-out conversion.

The change in the thinning-out method with respect to a change in display range can be effected by switching the SW 96 provided on the front panel and at the head of the TV camera 53, which is convenient when a more minuter observation is desired.

In the above-described construction, when the mode shown in FIG. 22(a) is selected by switching the SW 96, the respective cut-off frequencies of the LPFs 90, 91 and 92 are changed, for example, to 6 MHz, 18 MHz and 12 MHz. At the same time, the data writing, for example, to the synchronization memories 60a and 60b is changed through the controllers 99 and 100 and, further, the coefficients for the thinning-out interpolation at the thinning-out interpolation circuit 84 are changed. In this way, the resolution is changed and, at the same time, the thinning-out conversion is also changed. The resolution of the picture plane is as follows: the horizontal resolution for G is 1470 TV-line, the horizontal resolution for B is 980 TV-line, and the horizontal resolution for R is 490 TV-line. Thus, the highest level of resolution of those of the three modes shown in FIGS. 22(a) through 22(c) is obtained. However, in this mode, the display area of the picture plane is 25% smaller than the full-sized picture plane.

When the user requires only a minimum requisite resolution and prefers a full-sized picture-plane display, he switches the switch SW 96 so as to select the mode shown in FIG. 22(c). As shown in FIG. 22(c), the data written to the synchronization memory at this time consists of 1440 pixels as counted along the horizontal dimension and 1035 pixels as counted along the vertical dimension. The respective cut-off frequencies of the LPFs 90, 91 and 92 are switched, for example, to 5.5 MHz, 16 MHz and 11 MHz. As for the resolution of the picture plane, the horizontal resolution for G is 1100 TV-line, the horizontal resolution for B is 740 TV-line, and the horizontal resolution for R is 370 TV-line.

When a display is to be effected with a resolution which is intermediate between those of the above-described two modes by using 90% of the pixels with respect to the horizontal dimension, the user can select the mode shown in FIG. 22(b). In that case, the respective cut-off frequencies of the LPFs 90, 91 and 92 are switched, for example, to 4.6 MHz, 14 MHz and 9 MHz. As for the resolution, the horizontal resolution of G is 1330 TV-line, the horizontal resolution of B is 880 TV-line, and the horizontal resolution of R is 440 TV-line.

The respective cut-off frequencies of the LPFs 90, 91 and 92 may be fixed to 6 MHz, 18 MHz and 12 MHz for the three modes.

With this embodiment, it is possible to obtain a high-resolution image by using an HDTV device for a single-plate high-resolution TV camera. Further, although this embodiment uses an ordinary monitor as the means for displaying endoscopic images, a sufficient level of resolution for endoscopic images can be obtained with a monitor having a central resolution, for example, of 100 TV-line. Also, in this embodiment, when displaying the output of the HDTV device on an ordinary monitor, selection of resolution and a changing in display size are possible by switching the cut-off frequencies and changing the thinning-out conversion.

While in the above-described embodiment the thinning-out processing was effected along the vertical dimension, it is also possible to effect thinning-out along the horizontal dimension if it is so required depending upon the size of image to be displayed.

While the above description has been given with reference to an external TV camera, it also applies to an electronic endoscope apparatus of the type in which the above-described image sensing device is provided at the front end of the endoscope.

The object whose image is to be picked up by the endoscope imaging apparatus of the present invention, which will find its use in medical and industrial fields, varies depending upon the use to which the apparatus is applied. Accordingly, the filter number ratio of the color mosaic filter is not limited to that disclosed above; it may be changed so as to be adapted to the object.

In the present invention, it is obvious that a variety of modifications can be realized on the basis of the spirit of the invention. The scope of the present invention is not restricted by any particular embodiments thereof save by the appended claims.

What is claimed is:

1. An endoscope imaging apparatus comprising:

an endoscope for observing the interior of an object to be observed;

a light source section for supplying illuminating light to said object through said endoscope;

a solid-state image sensing device including an image-pick-up surface and a color mosaic filter which is attached to said image pick-up surface and in which the number of filters transmitting a green light component or a complementary-color-type light component, the number of filters transmitting a blue light component or a first-complementary-color light component, and the number of filters transmitting a red light component or a second-complementary-color light component are arranged in the proportion of 3:2:1, said solid-state image sensing device picking up an image of said object to output color image signals by a plurality of pixels composed of the filters of said color mosaic filter and photosensitive elements formed on said image pick-up surface and opposed to said filters; and a signal processing section for performing signal processing on the color image signals output from said solid-state image sensing device.

2. An endoscope imaging apparatus according to claim 1, wherein said signal processing section includes a plurality of frequency passing means constructed in such a way that the frequency bandwidth for passing the blue-component signals or first-complementary-color-component signals of said color image signals is the same as or smaller than the frequency bandwidth for passing the green-component signals or the complementary-color-type-component signals, and that the frequency bandwidth for passing the red-component signals or the second-complementary-color-component signals is smaller than the frequency bandwidth for passing the blue-component signals or the first-complementary-color-light-component signals.

3. An endoscope imaging apparatus according to claim 1, wherein in said color mosaic filter, the odd rows as counted along the vertical scanning dimension consist of green-component or complementary-color-type-component filters, and, in the even rows, the (3n−2)th and (3n−1)th (n =1, 2, 3, . . . ) columns as counted along the horizontal scanning dimension consist of blue-component or first-complementary-color-component filters, and the 3n-th columns consist of red-component or second-complementary-color-component filters.

4. An endoscope imaging apparatus according to claim 1, wherein, of the odd rows as counted along the vertical scanning dimension of said color mosaic filter, the (3n−2)th and (3n−1)th columns (n=1, 2, 3, . . . ) as counted along the horizontal scanning dimension consist of green-component or complementary-color-type-component filters, the 3n-th columns as counted along the horizontal scanning dimension consisting of red-component or second-complementary-color-component filters, and wherein, in the even rows as counted along the vertical scanning dimension, the (3n−2)th and (3n−1)th columns as counted along the horizontal scanning dimension consist of blue-component or first-complementary-color-component filters, and the 3n-th columns consist of green-component or complementary-color-type-component filters.

5. An endoscope imaging apparatus according to claim 1, wherein, of the odd rows of said color mosaic filter as counted along the vertical scanning dimension, the (3n−2)th and (3n−1)th (n=1, 2, 3, . . . ) columns as counted along the horizontal scanning dimension consist of green-component or complementary-color-type-component filters, and the 3n-th columns as counted along the horizontal scanning dimension consist of blue-component or first-complementary-color-component filters, and wherein, in the even rows as counted along the vertical scanning dimension, the (3n−2)th columns as counted along the horizontal scanning dimension consist of blue-component or first-complementary-color-component filters, the (3n−1)th columns consist of red-component or second-complementary-color-component filters, and the 3n-th columns consisting of green-component or complementary-color-type-component filters.

6. An endoscope imaging apparatus according to claim 1, wherein, of the odd rows as counted along the vertical scanning dimension of said color mosaic filter, the (2n−1)th columns (n=1, 2, 3, . . . ) consist of green-component or complementary-color-type-component filters, and the (6n−4)th columns consist of red-component or second-complementary-color-component filters, the remaining columns consisting of blue-component or first-complementary-color-component filters, and wherein, of the even rows as counted along the vertical scanning dimension, the 2n-th columns as counted along the horizontal scanning dimension consist of green-component or complementary-color-type-component filters, and the (6n−1)th columns consist of red-component or second-complementary-color-component filters, the remaining columns consisting of blue-component or first-complementary-color-component filters.

7. An endoscope imaging apparatus according to claim 1, wherein, of the odd rows as counted along the vertical scanning dimension of said color mosaic filter, the (6n−5)th, (6n−4)th and (6n−3)th columns as counted along the horizontal scanning dimension consist of green-component or complementary-color-type-component filters, and the remaining columns consist of blue-component or first-complementary-color-component filters and red-component or second-complementary-color-component filters, which are arranged in the proportion of 2:1, and wherein, of the even rows as counted along the vertical scanning dimension, the (6n−2)th, (6n−1)th and 6n-th columns consist of green-component or complementary-color-type-component filters, and the remaining columns consist of blue-component or first-complementary-color-component filters and red-component or second-complementary-color-component filters, which are arranged in the proportion of 2:1.

8. An endoscope imaging apparatus according to claim 1, wherein said color mosaic filter exhibits a filter arrangement pattern in which, of the odd rows as counted along the vertical scanning dimension of said color mosaic filter, the first m columns (m is a multiple of 3) consist of green-component or complementary-color-type-component filters, and the next m columns consist of blue-component or first-complementary-color-component filters and red-component or second-complementary-color-component filters which are arranged in the proportion of 2:1, each of these patterns being repeated, and wherein, of the even rows as counted along the vertical scanning dimension, the next m columns consist of blue-component or first-complementary-color-component filters and red-component or second-complementary-color-component filters which are arranged in the proportion of 2:1, and the next m columns consist of green-component or complementary-color-type-component filters, each of these patterns being repeated.

9. An endoscope imaging apparatus according to claim 1, wherein, of the odd rows as counted along the vertical scanning dimension of said color mosaic filter, the (3n−2)th and (3n−1)th columns (n−1, 2, 3, . . . ) as counted along the horizontal scanning dimension consist of green-component or complementary-color-type-component filters, and the (6n−3)th columns consist of red-component or second-complementary-color-component filters, the 6n-th columns consisting of blue-component or first-complementary-color-component filters, and wherein, of the even rows as counted along the vertical scanning dimension, the (3n−2)th and (3n−1)th columns as counted along the horizontal scanning dimension consist of blue-component or first-complementary-color-component filters, and the (6n−3) th columns consist of green-component or complementary-color-type-component filters, the 6n-th columns consisting of red-component or second-complementary-color-component filters.

10. An endoscope imaging apparatus according to claim 2, wherein said signal processing section includes a storage means for synchronizing the green-component or the complementary-color-type-component signals, the blue-component or the first-complementary-color-component signals, and the red-component or the second-complementary-color-component signals.

11. An endoscope imaging apparatus according to claim 2, wherein said frequency passing means consist of a plurality of low-pass filters whose cut-off frequencies are set in such a way that the frequency band width for passing the blue-component or the first-complementary-color-component signals is equal to or smaller than the frequency band width for passing the green-component or complementary-color-type-component signals, and that the frequency band width for passing the red-component or second-complementary-color-component signals is smaller than the frequency band width for passing the blue-component or the first-complementary-color-component signals.

12. An endoscope imaging apparatus according to claim 1, wherein in said color mosaic filter, the even rows as counted along the vertical scanning dimension consist of green-component or complementary-color-type-component filters, and, in the odd rows, the (3n−2)th and (3n−1)th (n=1, 2, 3, . . . ) columns as counted along the horizontal scanning dimension consist of blue-component or first-complementary-color-component filters, and the 3n-th columns consist of red-component or second-complementary-color-component filters.

13. An endoscope imaging apparatus according to claim 1, wherein, of the even rows as counted along the vertical scanning dimension of said color mosaic filter, the (3n−2)th and (3n−1)th columns (n=1, 2, 3, . . . ) as counted along the horizontal scanning dimension consist of green-component or complementary-color-type-component filters, the 3n-th columns as counted along the horizontal scanning dimension consisting of red-component or second-complementary-color-component filters, and wherein, in the odd rows as counted along the vertical scanning dimension, the (3n−2)th and (3n−1)th columns as counted along the horizontal scanning dimension consist of blue-component or first-complementary-color-component filters, and the 3n-th columns consist of green-component or complementary-color-type-component filters.

14. An endoscope imaging apparatus according to claim 1, wherein, of the even rows of said color mosaic filter as counted along the vertical scanning dimension, the (3n−2)th and (3n−1)th (n=1, 2, 3, . . . ) columns as counted along the horizontal scanning dimension consist of green-component or complementary-color-type-component filters, and the 3n-th columns as counted along the horizontal scanning dimension consist of blue-component or first-complementary-color-component filters, and wherein, in the odd rows as counted along the vertical scanning dimension, the (3n−2)th columns as counted along the horizontal scanning dimension consist of blue-component or first-complementary-color-component filters, the (3n−1)th columns consist of red-component or second-complementary-color-component filters, and the 3n-th columns consisting of green-component or complementary-color-type-component filters.

15. An endoscope imaging apparatus according to claim 1, wherein, of the even rows as counted along the vertical scanning dimension of said color mosaic filter, the (2n−1)th columns (n−1, 2, 3, . . . ) consist of green-component or complementary-color-type-component filters, and the (6n−4)th columns consist of red-component or second-complementary-color-component filters, the remaining columns consisting of blue-component or first-complementary-color-component filters, and wherein, of the odd rows as counted along the vertical scanning dimension, the 2n-th columns as counted along the horizontal scanning dimension consist of green-component or complementary-color-type-component filters, and the (6n−1)th columns consist of red-component or second-complementary-color-component filters, the remaining columns consisting of blue-component or first-complementary-color-component filters.

16. An endoscope imaging apparatus according to claim 1, wherein, of the even rows as counted along the vertical scanning dimension of said color mosaic filter, the (6n−5)th, (6n−4)th and (6n−3)th columns as counted along the horizontal scanning dimension consist of green-component or complementary-color-type-component filters, and the remaining columns consist of blue-component or first-complementary-color-component filters and red-component or second-complementary-color-component filters, which are arranged in the proportion of 2:1, and wherein, of the odd rows as counted along the vertical scanning dimension, the (6n−2)th, (6n−1)th and 6n-th columns consist of green-component or complementary-color-type-component filters, and the remaining columns consist of blue-component or first-complementary-color-component filters and red-component or second-complementary-color-component filters, which are arranged in the proportion of 2:1.

17. An endoscope imaging apparatus according to claim 1, wherein said color mosaic filter exhibits a filter arrangement pattern in which, of the even rows as counted along the vertical scanning dimension of said color mosaic filter, the first m columns (m is a multiple of 3) consist of green-component or complementary-color-type-component filters, and the next m columns consist of blue-component or first-complementary-color-component filters and red-component or second-complementary-color-component filters which are arranged in the proportion of 2:1, each of these patterns being repeated, and wherein, of the odd rows as counted along the vertical scanning dimension, the next m columns consist of blue-component or first-complementary-color-component filters and red-component or second-complementary-color-component filters which are arranged in the proportion of 2:1, and the next m columns consist of green-component or complementary-color-type-component filters, each of these patterns being repeated.

18. An endoscope imaging apparatus according to claim 1, wherein, of the even rows as counted along the vertical scanning dimension of said color mosaic filter, the (3n−2)th and (3n−1)th columns (n−1, 2, 3, . . . ) as counted along the horizontal scanning dimension consist of green-component or complementary-color-type-component filters, and the (6n−3)th columns consist of red-component or second-complementary-color-component filters, the 6n-th columns consisting of blue-component or first-complementary-color-component filters, and wherein, of the odd rows as counted along the vertical scanning dimension, the (3n−2)th and (3n−1)th columns as counted along the horizontal scanning dimension consist of blue-component or first-complementary-color-component filters, and the (6n−3)th columns consist of green-component or complementary-color-type-component filters, the 6n-th columns consisting of red-component or second-complementary-color-component filters.

* * * * *